(12) United States Patent
Mininger et al.

(10) Patent No.: US 10,775,750 B2
(45) Date of Patent: *Sep. 15, 2020

(54) CHARGING STATION WITH LIQUID CONTROL CHAMBER

(71) Applicant: TXS Industrial Design, Inc., Richardson, TX (US)

(72) Inventors: Staci A. Mininger, Garland, TX (US); Timothy W. Terleski, Richardson, TX (US)

(73) Assignee: TXS Industrial Design, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,489

(22) Filed: Feb. 13, 2020

(65) Prior Publication Data

US 2020/0183335 A1    Jun. 11, 2020

Related U.S. Application Data

(63) Continuation-in-part of application No. 15/706,433, filed on Sep. 15, 2017, now Pat. No. 10,566,823.

(51) Int. Cl.
*H02J 7/00* (2006.01)
*G04G 17/06* (2006.01)
(Continued)

(52) U.S. Cl.
CPC ............ *G04G 17/06* (2013.01); *G04G 13/02* (2013.01); *G04G 19/00* (2013.01); *G04G 21/08* (2013.01);
(Continued)

(58) Field of Classification Search
CPC ....................................................... H02J 50/90
(Continued)

(56) References Cited

U.S. PATENT DOCUMENTS 7,271,569 B2 * 9/2007 Oglesbee ............... H02J 50/10
320/108
8,547,058 B2 * 10/2013 Tabata .................... H02J 50/90
320/108

(Continued)

OTHER PUBLICATIONS

Office Action dated Sep. 19, 2018; U.S. Appl. No. 15/706,433, filed Sep. 15, 2017; 6 pages.
(Continued)

*Primary Examiner* — Yalkew Fantu
(74) *Attorney, Agent, or Firm* — Conley Rose, P.C.; Grant Rodolph; Brooks W Taylor

(57) ABSTRACT

A charging station is provided, having an AC outlet, a USB outlet, and a wireless charging circuit, with a liquid control chamber having one or more walls that receive liquid passing through the AC outlet and drain it down a drain tube. The drain tube delivers the liquid to a drain aperture surrounded by walls in the bottom of the charging station, where the liquid is retained while it drains out of the charging station. The charging station may also include one or both of a wireless receiver and speaker, and/or a clock controller, a plurality of multi-function controls, and an audio transducer. The speaker outputs an audio signal corresponding to a received wireless signal. The clock controller provides alarm clock functionality via a display and the audio transducer in response to the multi-function controls.

20 Claims, 10 Drawing Sheets

(51) Int. Cl.
    *H02J 50/90*     (2016.01)
    *G04G 19/00*     (2006.01)
    *G04G 21/08*     (2010.01)
    *G04G 13/02*     (2006.01)
    *H02J 50/10*     (2016.01)

(52) U.S. Cl.
    CPC ............ *H02J 7/0044* (2013.01); *H02J 50/10* (2016.02); *H02J 50/90* (2016.02); *H02J 2207/30* (2020.01)

(58) Field of Classification Search
    USPC ........................................................ 320/108
    See application file for complete search history.

(56) References Cited

U.S. PATENT DOCUMENTS

| | | |
|---|---|---|
| 10,566,823 B2 | 2/2020 | Mininger et al. |
| 2014/0097793 A1* | 4/2014 | Wurtz .................. H02J 7/0044 320/108 |
| 2014/0340025 A1* | 11/2014 | Rief ...................... H02J 7/0044 320/107 |
| 2015/0134869 A1* | 5/2015 | Graham ................ G06F 1/1632 710/304 |
| 2016/0204638 A1 | 7/2016 | Miraglia et al. |
| 2016/0324719 A1 | 11/2016 | Badmus et al. |

OTHER PUBLICATIONS

Office Action dated Apr. 17, 2019; U.S. Appl. No. 15/706,433, filed Sep. 15, 2017; 11 pages.
Notice of Allowance dated Sep. 20, 2019; U.S. Appl. No. 15/706,433, filed Sep. 15, 2017; 8 pages.

* cited by examiner

CHARGING STATION WITH LIQUID CONTROL CHAMBER

CROSS-REFERENCE TO RELATED APPLICATIONS

This application is a continuation-in-part of U.S. patent application Ser. No. 15/706,433 filed Sep. 15, 2017 by Staci A. Mininger, et al. entitled, "Charging Station with Liquid Control Chamber", which is incorporated by reference herein as if reproduced in its entirety.

TECHNICAL FIELD OF THE DISCLOSURE

The present application relates generally to charging stations and, more specifically, to charging stations with additional functions.

BACKGROUND OF THE DISCLOSURE

Charging stations enable portable and other devices to be recharged. Some charging stations are large enough to physically support one or more devices being charged. The space occupied by such charging stations may significantly reduce the amount of space available on a desk, side table, or other horizontal surface.

SUMMARY OF THE DISCLOSURE

In a first embodiment, a charging station includes an alternating current (AC) outlet, a USB outlet, a wireless charging circuit, a liquid control chamber, and a drain aperture. The AC outlet is located in a top side of the charging station, and the USB outlet is located in a second side of the charging station. The wireless charging circuit is configured to sense the presence of an electronic device placed in proximity to the top side of the charging station and wirelessly charge the electronic device. The liquid control chamber is inside the charging station, beneath the AC outlet, and includes one or more walls and a drain tube. The liquid control chamber receives liquid passing through the AC outlet and directs substantially all the liquid to a top end of the drain tube. The drain aperture is in a bottom side of the charging station and is also surrounded by one or more walls. The walls retain substantially all the liquid that exists from a bottom end of the drain tube while the liquid exits the charging station via the drain aperture.

In a second embodiment, the charging station of the first embodiment further includes a wireless receiver that is electrically coupled to a speaker. The wireless receiver receives a wireless signal from an external audio source and outputs via the speaker an audio signal corresponding to the received wireless signal via the speaker.

In a third embodiment, the charging station of either the first or second embodiment further includes a clock controller, a plurality of multi-function controls, and an audio transducer. The clock controller is electrically coupled to a display and provides alarm clock functionality via the display and the audio transducer. The clock controller controls alarm clock functionality in response to activation of one or more of the multi-function controls.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus for a charging station with fluid control chambers.

The present disclosure relates to a charging station providing an AC outlet, a USB outlet, and a wireless charging circuit, with an internal fluid control chamber surrounding a lower portion of the AC outlet, such that substantially all fluid entering the charging station via the AC outlet is initially retained within the fluid control chamber and subsequently exits the charging station via a drain aperture.

Figure 1:
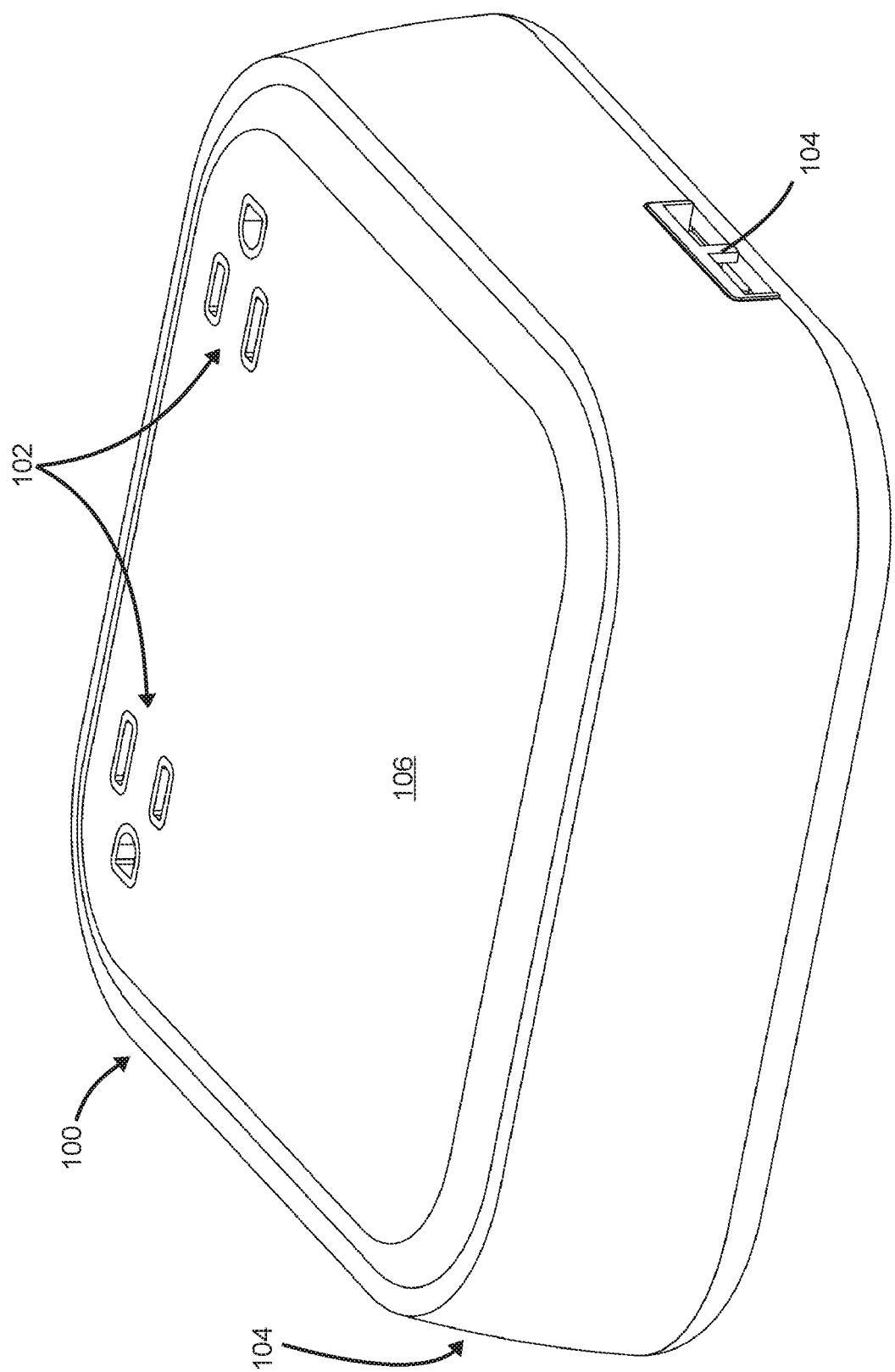
FIG. 1 presents an isometric view of a charging station according to a first embodiment of the disclosure.

FIG. 1 presents an isometric view of a charging station 100 according to a first embodiment of the disclosure. The charging station 100 includes a power cable and standard plug (not visible in FIG. 1) for connection to an alternating current (AC) outlet to provide electrical power to the charging station 100. A top face of the charging station 100 includes AC outlets 102 electrically coupled to the power cable, the outlets operable to provide AC electrical power to external devices for charging or operation or both. While the AC outlets 102 shown in FIG. 1 are standard outlets for nominal 120 volt operation, it will be understood that, in other embodiments, AC outlets 102 may be standard outlets for nominal 240 volt operation or a mixture of AC outlets of different types. In some embodiments, the AC outlets 102 are tamper-resistant outlets, having features that block the insertion of anything other than a properly configured AC plug into the openings of the outlet.

A first side face of the charging station 100 includes first Universal Serial Bus (USB) outlets 104. A second side face of the station 100 (not visible in FIG. 1) includes second USB outlets 104. In some embodiments, one or both of the USB outlets 104 may be USB-C outlets. In other embodiments, one or more USB outlets may be located on a front side or other side of the charging station 100.

A wireless charging region 106 of the top face of the charging station 100 is adapted for wireless charging. In some embodiments, the charging station 100 is adapted to detect a wireless charging standard used by an external device placed on or near the wireless charging region 106 and to provide wireless charging using the detected standard. Such wireless charging may be provided under the Qi wireless charging standard, developed by the Wireless Power Consortium, the Power Matters Alliance (PMA) standard from the AirFuel Alliance, or other wireless charging standard, such that the charging station 100 provides multi-standard wireless charging.

Thus, the charging station 100 may provide charging power to external devices simultaneously via one or more of the AC outlets 102, the USB outlets 104, and the wireless charging circuit associated with the wireless charging region 106.

Figure 2:
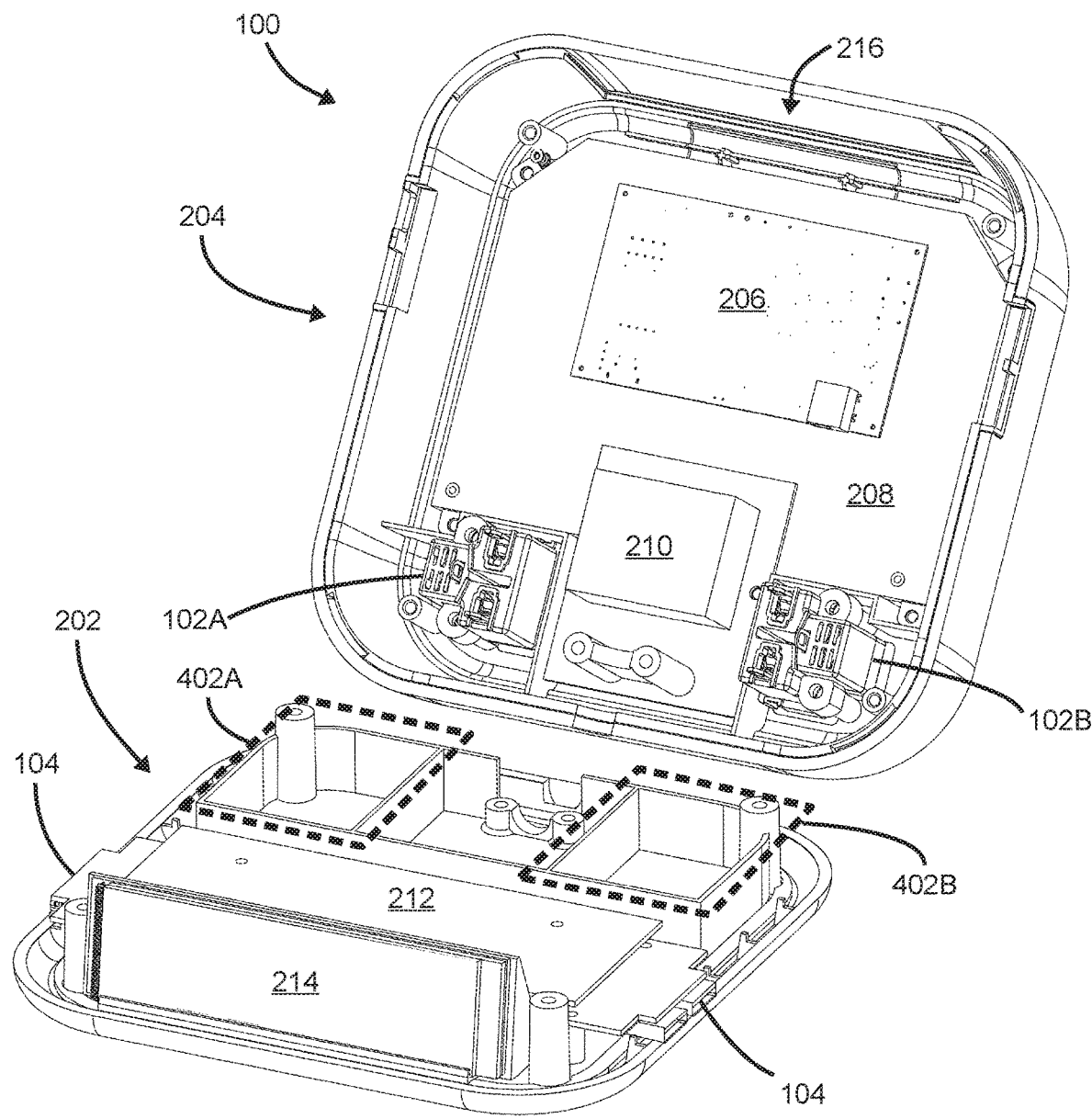
FIG. 2 presents an internal view of components of the charging station of FIG. 1.

FIG. 2 presents an internal view of components of the charging station 100 of FIG. 1. The charging station 100 includes a chassis 202 and an upper housing 204. A wireless charging control board 206 and associated wireless charging antenna 208 are mounted in the upper housing 204. A high voltage power supply 210 receives AC power from a wall outlet or other power source and provides surge suppression to the AC outlets 102A and 102B, as well as to a direct current (DC) low voltage power supply 212. The power supply 212 is a switching supply providing surge suppression and 5 volt (V) and/or one or more other voltages (e.g., 12V) to the electronic circuits of the charging station 100, as well as to the USB outlets 104.

The charging station 100 may include a plurality of power supplies 212. For example, a first power supply 212 may be electrically coupled to the wireless charging control board 206 and provide a preset voltage to the wireless charging control board 206, based upon a wireless charging standard or power level required by a device being wirelessly charged. In some embodiments, such a preset power output from the first power supply 212 is supplied in response to a signal received by the first power supply 212 from the wireless charging control board 206.

In another example, a second power supply 212 may provide a preset amperage to one or both USB outlets 104, based on a charging power requirement of a device electrically connected to the USB outlet 104. In some embodiments, the second power supply 212 directly senses the charging power requirement of the connected device and adjusts its output accordingly.

The chassis 202 also includes fluid control chambers 402A and 402B which provide spill-through capability for liquids entering the charging station 100 through the associated AC outlets 102A and 102B. Bodies of the AC outlets 102A and 102B extend from a top portion of the upper housing 204 into the fluid control chambers 402A and 402B, respectively. The spill-through function of chambers 402A and 402B is described in greater detail below, with reference to FIG. 4.

In some embodiments, the chassis 202 further includes a display 214 that may be viewed through a translucent portion 216 of the upper housing 204. In other embodiments, the display 214 may be viewed directly or through a lens. The display 214 is described in greater detail below, with reference to FIG. 6.

Figure 3:
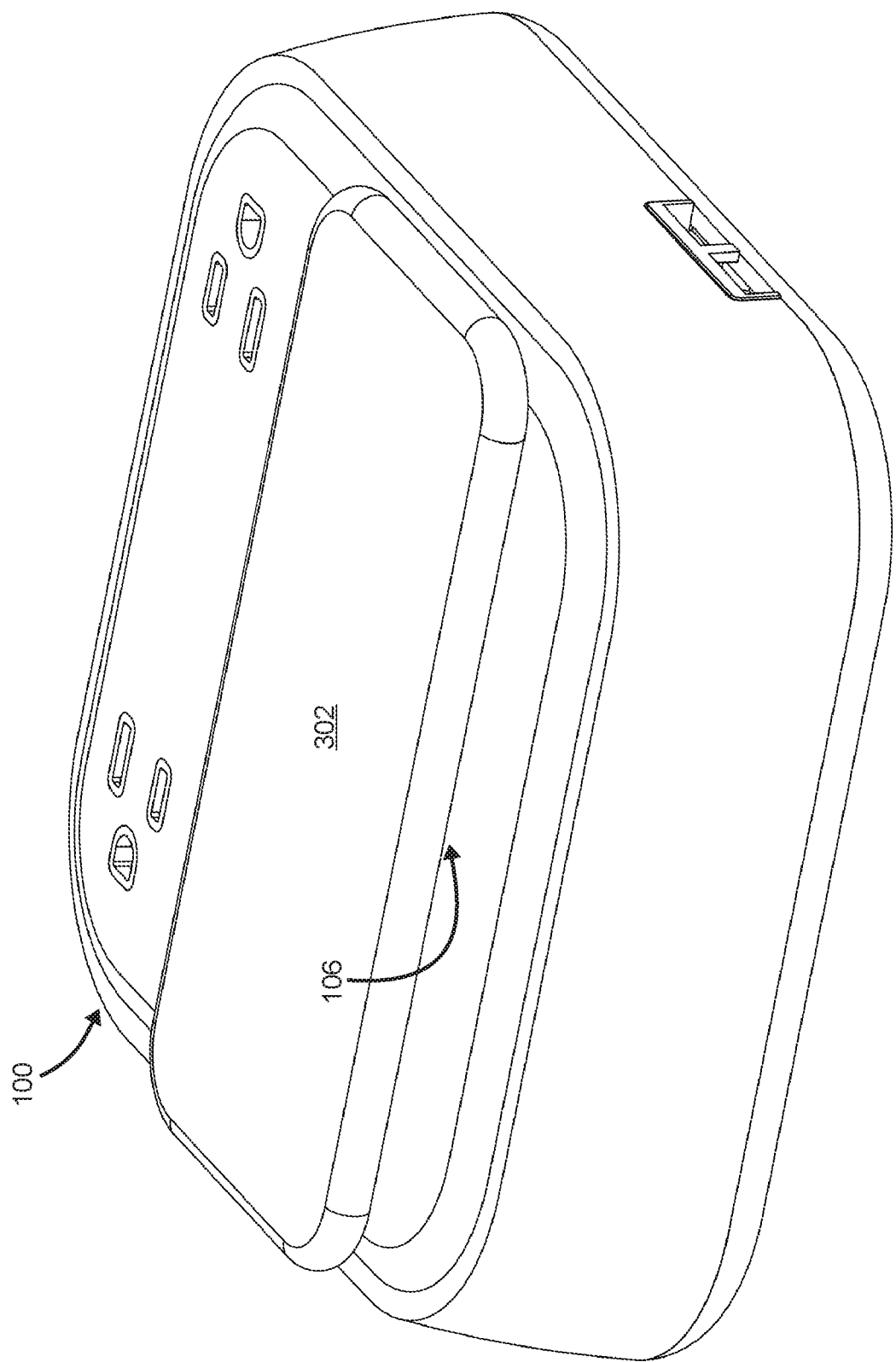
FIG. 3 presents an isometric view of the charging station of FIG. 1 in use.

FIG. 3 presents an isometric view of the charging station 100 of FIG. 1 in use. When an external device 302 is placed on the wireless charging region 106, the wireless charging control board 206 may use the wireless charging antenna 208 to detect a wireless charging standard used by the external device 302. In some embodiments, the detected wireless charging standard may be one of several possible standards. The wireless charging control board 206 then uses the wireless charging antenna 208 in compliance with the detected standard to charge the external device 302.

While FIG. 3 shows a single device being charged wirelessly by the charging station 100, it will be understood that multiple devices using the same wireless charging standard may be charged simultaneously by a charging station according to the disclosure.

Figure 4:
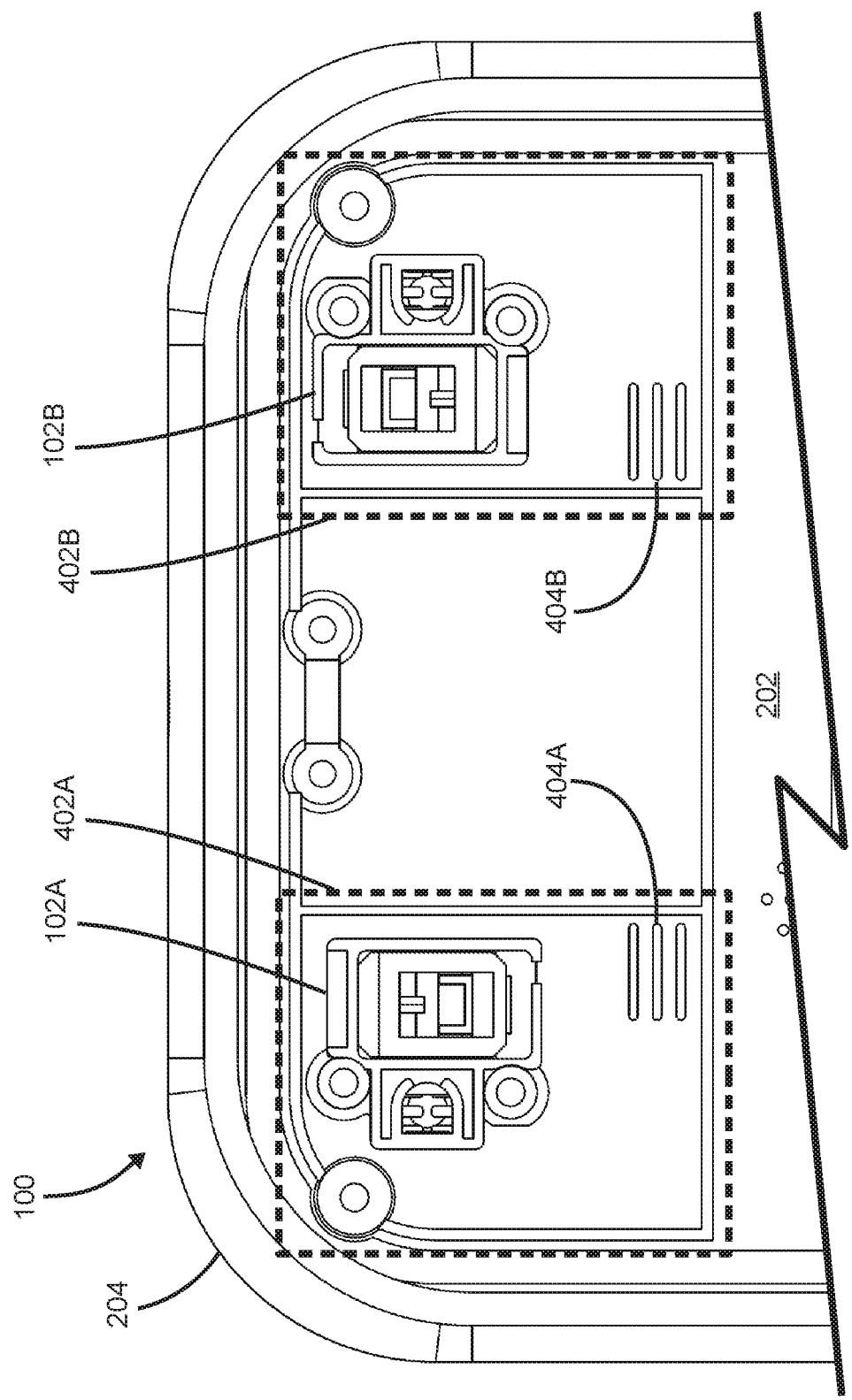
FIG. 4 presents a sectional view of the charging station of FIG. 1.

FIG. 4 presents a sectional view of the charging station 100 of FIG. 1. The view is along a horizontal plane passing just above the top edges of the walls comprising the fluid control chambers 402A and 402B, indicated above with reference to FIG. 2. The walls of the chambers 402A and 402B extend upward from the chassis 202 and form an unbroken barrier around the chambers 402A and 402B. The bodies of the AC outlets 102A and 102B extend down from a top portion of the upper housing 204 into the chambers 402A and 402B, respectively. The chambers 402A and 402B prevent liquid introduced into the AC outlets 102A and 102B from spreading within the charging station 100 beyond the chambers 402A and 402B.

The chassis 202 further includes drain apertures 404A and 404B surrounded by the walls of the fluid control chambers 402A and 402B. The drain apertures 404A and 404B permit liquids entering the fluid control chambers 402A and 402B to drain out of the charging station 100. The lower surfaces of the fluid control chambers 402A and 402B may be formed with a slope to direct liquids toward the drain apertures 404A and 404B. Thus, liquids spilled into the AC outlets 102A and 102B may pass through the charging station 100 without contacting electronics or other components within the charging station 100 other than the AC outlets 102A and 102B. While a film or residue of spilled liquid may remain on the walls and/or lower surfaces of the fluid control chambers 402A and 402B, substantially all fluid entering the charging station 100 via the AC outlets 102A or 102B exits the charging station 100 via the drain apertures 404A and 404B.

In some embodiments, the walls of the chambers 402A and 402B extend up around the bottom portions of the AC outlets 102A or 102B to a sufficient height to prevent liquid that is exiting horizontally from the outlets from passing over the walls and escaping the fluid control chambers. In other embodiments, the walls are sufficiently high to prevent liquid that is exiting the outlets from splashing in fluid that has not yet drained through the apertures 404A and 404B and thereby passing over the walls. In still other embodiments, the walls of the fluid control chambers 402A and 402B extend upward to meet with one or more surfaces of the upper housing 204, to more fully isolate liquids in the chambers from components of the charging station 100.

Figure 5:
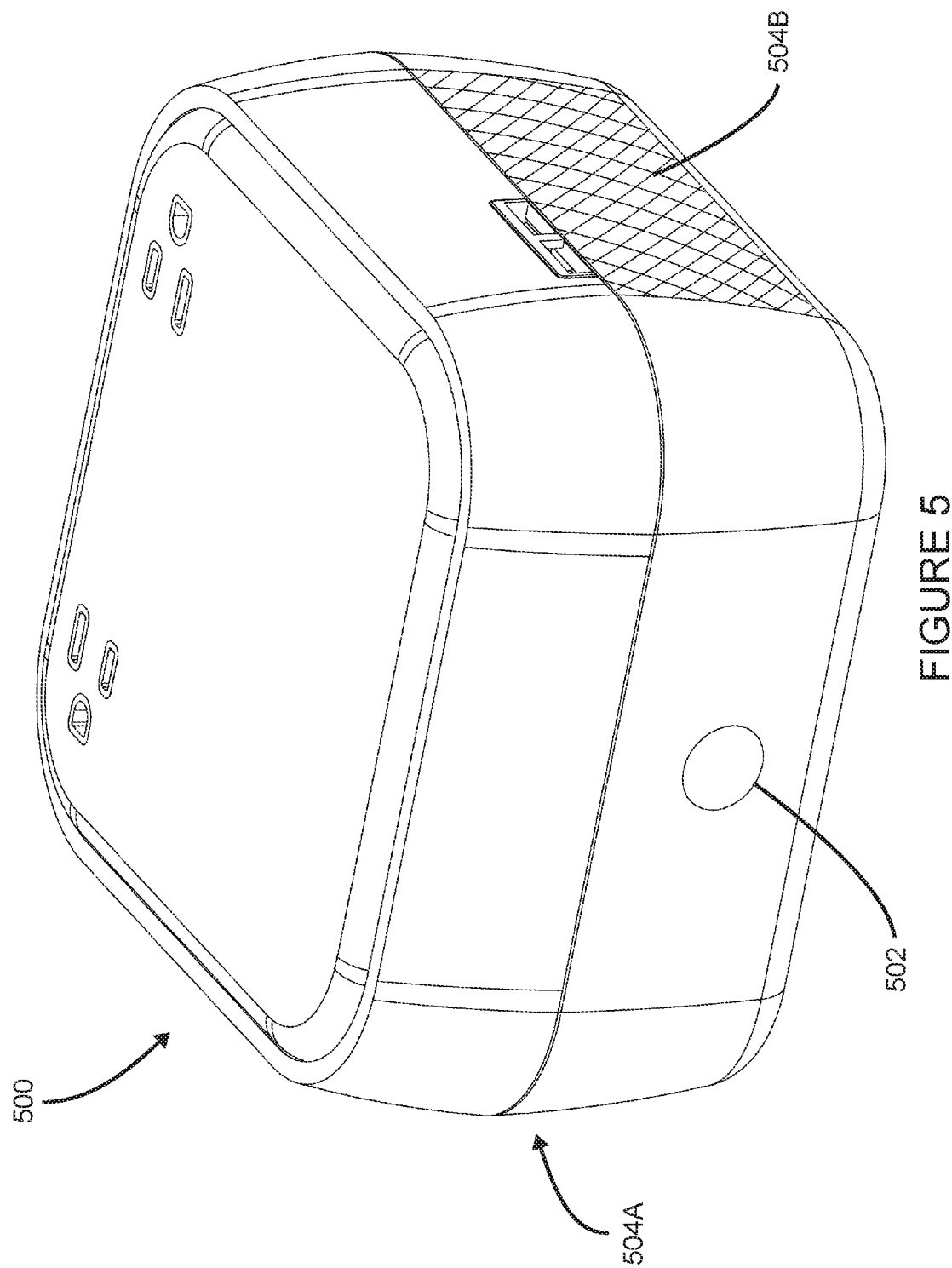
FIG. 5 presents an isometric view of a charging station according to a second embodiment of the disclosure.

FIG. 5 presents an isometric view of a charging station 500 according to a second embodiment of the disclosure. The charging station 500 includes elements associated with a speaker system adapted for wireless connectivity to a music player or other external audio source. The charging station 500 includes a wireless receiver, electrically coupled to an audio amplifier that is electrically coupled to one or more speakers 504A and 504B. In some embodiments, the wireless receiver is a Bluetooth-compatible receiver. In some embodiments, the wireless receiver is further electrically coupled to a so-called "pairing" button 502. The wireless receiver and the audio amplifier are further electrically coupled to and receive power from one or both of the high voltage power supply 210 and the DC low voltage power supply 212.

When a user of the charging station 500 has a wireless external audio source, the user may operate the external audio source to place it in a mode where it is available for pairing with other wireless devices. If the user then activates the pairing button 502, the wireless receiver is adapted to respond by performing a pairing procedure with the external audio source. Upon completion of the pairing procedure, the receiver will be operable to receive audio signals transmitted wirelessly from the external audio source and play the received audio signals via the audio amplifier and the speakers 504A and 504B. The external audio source may also be recharging from the charging station 500 while transmitting wireless audio to the charging station 500.

Figure 6:
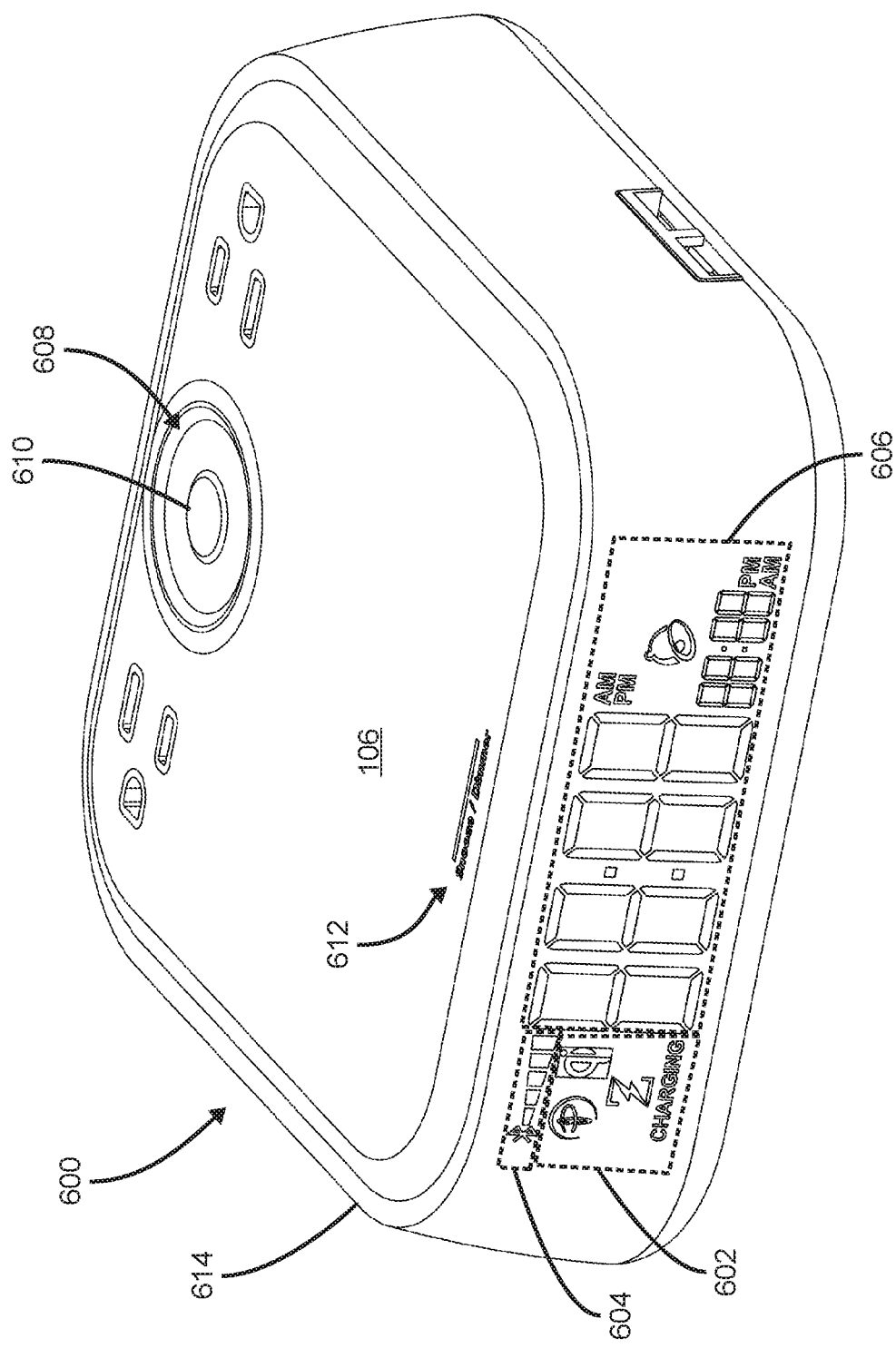
FIG. 6 presents an isometric view of a charging station according to a third embodiment of the disclosure.

FIG. 6 presents an isometric view of a charging station 600 according to a third embodiment of the disclosure. The charging station 600 includes elements associated with the display 214, described with reference to FIG. 2. In an embodiment of the disclosure having multi-standard wireless charging functionality, the display 214 may include a charging display 602, which indicates to a user which wireless charging standard is being used to charge an external device placed on the wireless charging region 106. In an embodiment of the disclosure having Bluetooth capability, the display 214 may include a Bluetooth display 604, which indicates to a user whether the charging station 600 is paired with an external Bluetooth device and the signal strength of the pairing. In still other embodiments, the charging station 600 includes alarm clock functionality and a clock display 606.

In such embodiments, the charging station 600 further includes a clock controller electrically coupled to the display 214, multi-function controls 608 and 610, snooze/brightness switch 612, and an audio transducer (not shown). As will be described in greater detail below, the clock controller is adapted to provide alarm clock functionality via the display 214 and audio transducer, and to control the alarm clock functionality in response to activation of one or more of the multi-function controls 608 and 610 and the snooze/brightness switch 612. The multi-function controls 608 and 610 may be referred to collectively as an alarm control device.

In some embodiments, the clock controller may be a microprocessor, microcontroller, field programmable gate array (FPGA), digital signal processor (DSP), or application-specific integrated circuit (ASIC), or other suitable programmable device with associated memory, clock, and hardware interface circuits, as will be understood by a person of skill in the art.

The multi-function controls 608 and 610 are capacitive touch sensors with the control 608 in the shape of a ring and the control 610 a round button. In other embodiments, multi-function controls according to the disclosure may be embodied in a single knob that may be rotated and/or depressed. In some such embodiments, the knob may be located in a cavity in the charging station 600, where the knob's upper surface does not extend above the upper surface of the charging station 600. In still other embodiments, multi-function controls according to the disclosure may be embodied in a plurality of buttons (e.g., increase, decrease, enter).

The snooze/brightness switch 612 is flush and built into the upper housing 614. The upper housing 614 has a living hinge with an elastomer overmold, so that when a user presses the snooze/brightness control 612, the elastomer flexes and the living hinge moves to actuate a physical microswitch underneath.

In a first procedure, a current date and time of the charging station 600 may be set or controlled. If the snooze/brightness switch 612 is held for a predetermined amount of time (e.g., six seconds), the charging station 600 enters a first phase of a date-setting mode. In this first phase, the user may operate the ring control 608 to set a desired year of the current date, displayed in the clock display 606. Once the desired year has been set, the user operates the button control 610 to enter a second phase of the date-setting mode. In this second phase, the user may operate the ring control 608 to set a desired month of the current date, also displayed in the clock display 606. Once the desired month has been set, the user operates the button control 610 to enter a third phase of the date-setting mode. In this third phase, the user may operate the ring control 608 to set a desired day of the month of the current date, displayed in the clock display 606.

Once the desired day of the month has been set, the user operates the button control 610 to enter a first phase of a time-setting mode, wherein the user may operate the ring control 608 to set a desired current hour, displayed in the clock display 606. Once the desired hour has been set, the user operates the button control 610 to enter a second phase of the time-setting mode, wherein the user may operate the ring control 608 to set a desired current minutes, also displayed in the clock display 606. The user then operates the button control 610 to return to normal operation.

The clock controller of the charging station 600 may compare the current month and day of the month to one or more preset combinations of month and day of the month and, if a match is found, change the current time, as the charging station 600 switches into or out of daylight savings time on the appropriate dates of the year.

In a second procedure, an alarm function of the charging station 600 may be set or controlled. When an alarm function of the charging station 600 is switched off, an alarm bell or other symbol is turned off in clock display 606. The user may operate the button control 610 briefly to place the charging station 600 into an alarm-setting mode. In this mode, the current setting of the alarm time is displayed as flashing digits in the clock display 606. The user may then operate the ring control 608 to set a desired alarm time.

Once the desired alarm time is displayed in the clock display 606, the user may operate the button control 610 to set (or arm) the alarm function and fix the current alarm time. If the user does not operate the button control 610 within a predetermined amount of time (e.g., 5 seconds) after operating the ring control 608 to set the desired alarm time, the clock controller of the charging station 600 automatically fixes the current alarm time and arms the alarm function. In either case, when the alarm function is armed, the current alarm time is displayed as steady (non-flashing) digits in an alarm time display portion of the clock display 606 and the alarm bell or other symbol is turned on in clock display 606.

While the alarm function is armed, two events may occur that affect the alarm function. In the first event, the user operates the button control 610, which switches the alarm function off and turns off the alarm bell or other symbol in clock display 606. In the second event, the current time reaches the current alarm time, the alarm function triggers, and the charging station 600 emits an alarm sound via the audio transducer.

Once the alarm has triggered, another two events may occur that affect the alarm function. In the first event, the user may operate the button control 610, which switches the alarm function off, turns off the alarm bell or other symbol in clock display 606, and turns off the alarm sound. In the second event, the user operates the snooze/brightness switch 612, which turns off the alarm sound. The charging station 600 then waits for a predetermined amount of time (e.g., nine minutes) before again emitting the alarm sound via the audio transducer.

In a third procedure, a display brightness of the charging display 602, the Bluetooth display 604 (if present), and the clock display 606 (collectively, displays 602-606) of the charging station 600 may be controlled. When the displays 602-606 are at full brightness setting and the user presses the snooze/brightness switch 612, the displays 602-606 are changed to a medium brightness setting. When the displays 602-606 are at the medium brightness setting and the user presses the snooze/brightness switch 612, the displays 602-606 are changed to a dim brightness setting. When the displays 602-606 are at the dim brightness setting and the user presses the snooze/brightness switch 612, the displays 602-606 are turned off.

Once the displays 602-606 are turned off, two events may occur that affect the display brightness. In a first event, the user presses the snooze/brightness switch 612 and the displays 602-606 are returned to full brightness setting. In the second event, the alarm triggers and the displays 602-606 are returned to full brightness setting.

Because of the multitude of functions controlled using the snooze/brightness switch 612, the snooze/brightness switch 612 may also be referred to as a multi-function control. In other embodiments, the charging station 600 may have any number of brightness levels (other than off) more than or less than the three brightness levels described above. In still other embodiments, a charging station according to the disclosure may include both the wirelessly connected speaker system described with reference to FIG. 5 and the alarm clock system described with reference to FIG. 6.

Figure 7:
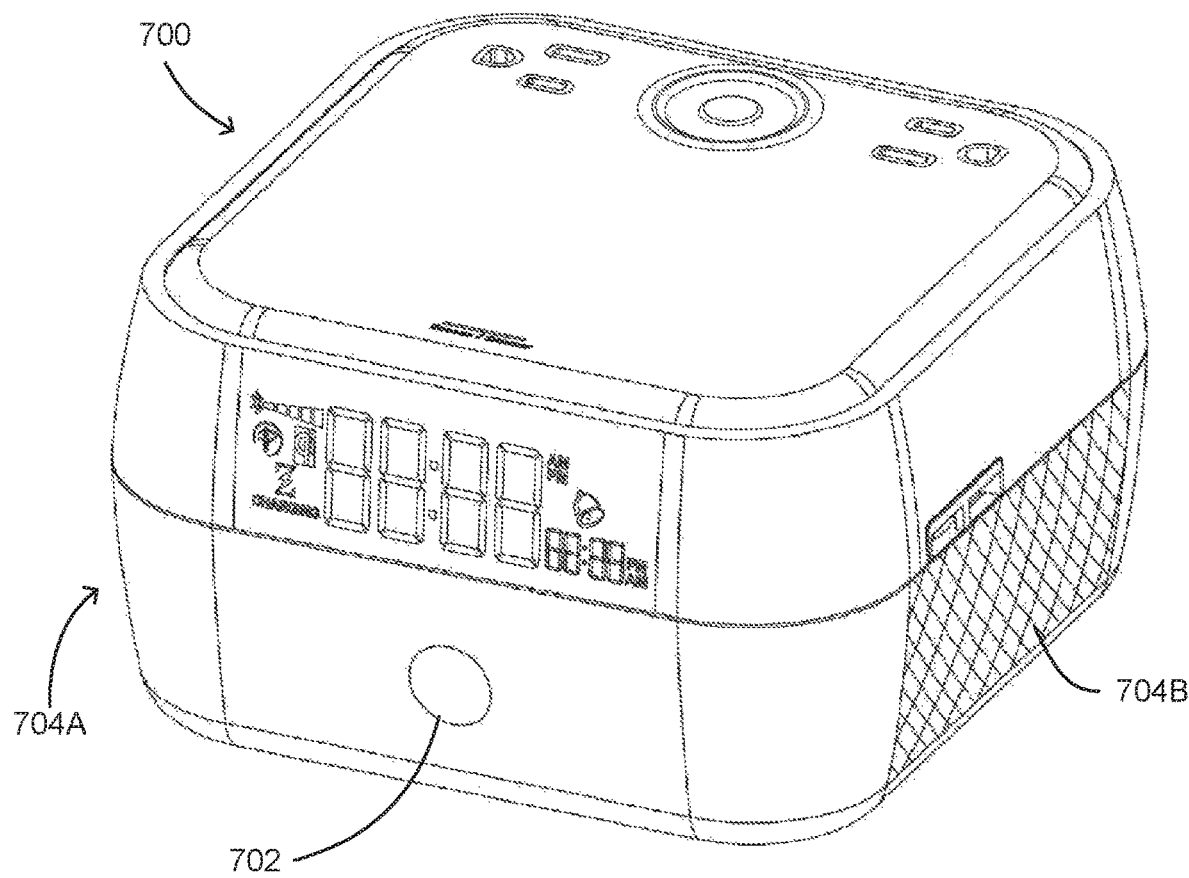
FIG. 7 presents an isometric view of a charging station according to a fourth embodiment of the disclosure.

FIG. 7 presents an isometric view of a charging station 700 according to a fourth embodiment of the disclosure. The charging station 700 includes a pairing button 702 and speakers 704A and 704B and is configured for wireless connectivity to a music player or other external audio source, as described for the charging station 500 with reference to FIG. 5. Similarly, the charging station 700 includes elements associated with the display 214, described with reference to FIG. 2, including a charging display, a Bluetooth display, a clock display, as described for the similarly named displays 602, 604, and 606 of the charging station 600, described with reference to FIG. 6. The charging station 700 further includes multi-function controls, a snooze/brightness switch, and an audio transducer, as described for the multi-function controls 608 and 610, the snooze/brightness switch 612, and the audio transducer of the charging station 600, described with reference to FIG. 6.

Figure 8:
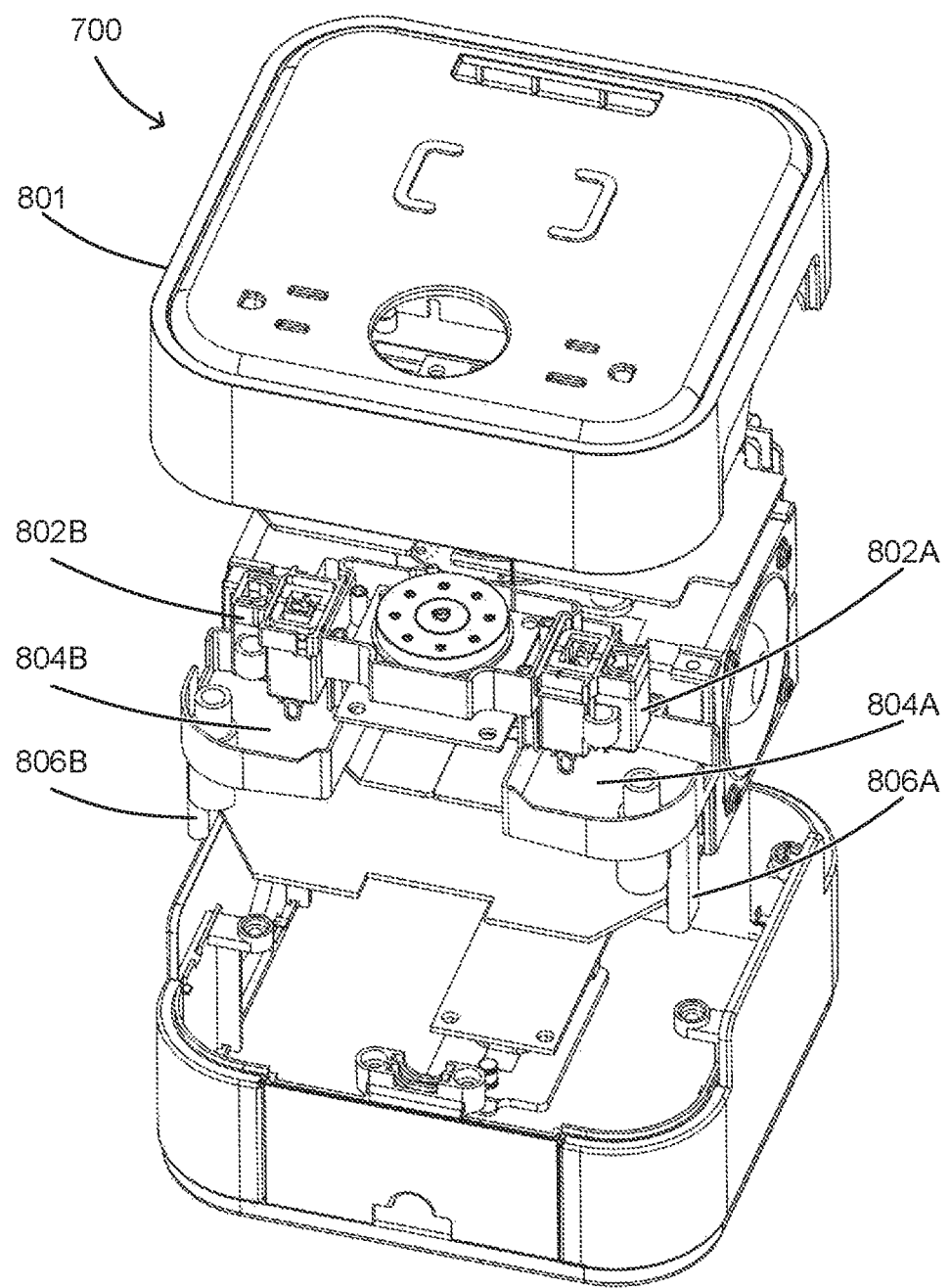
FIG. 8 presents an isometric exploded view of internal components of the charging station of FIG. 7.

FIG. 8 presents an isometric exploded view of internal components of the charging station 700 of FIG. 7. The charging station 700 includes AC outlets 802A and 802B mounted in a top side of a housing 801 of the charging station 700 and extending into the interior of the charging station 700. Beneath the AC outlets 802A and 802B, within the charging station 700, are associated liquid control chambers 804A and 804B. The liquid control chamber 804A includes a drain tube 806A and is configured to receive liquid passing through the AC outlet 802A and has a sloped interior surface configured to direct substantially all the liquid passing through the AC outlet 802A to a top end (not visible in FIG. 8) of the drain tube 806A. The liquid control chamber 804B similarly includes a drain tube 806B and is configured to receive liquid passing through the AC outlet 802B and direct substantially all the liquid passing through the AC outlet 802B to a top end (also not visible in FIG. 8) of the drain tube 806B.

Figure 9:
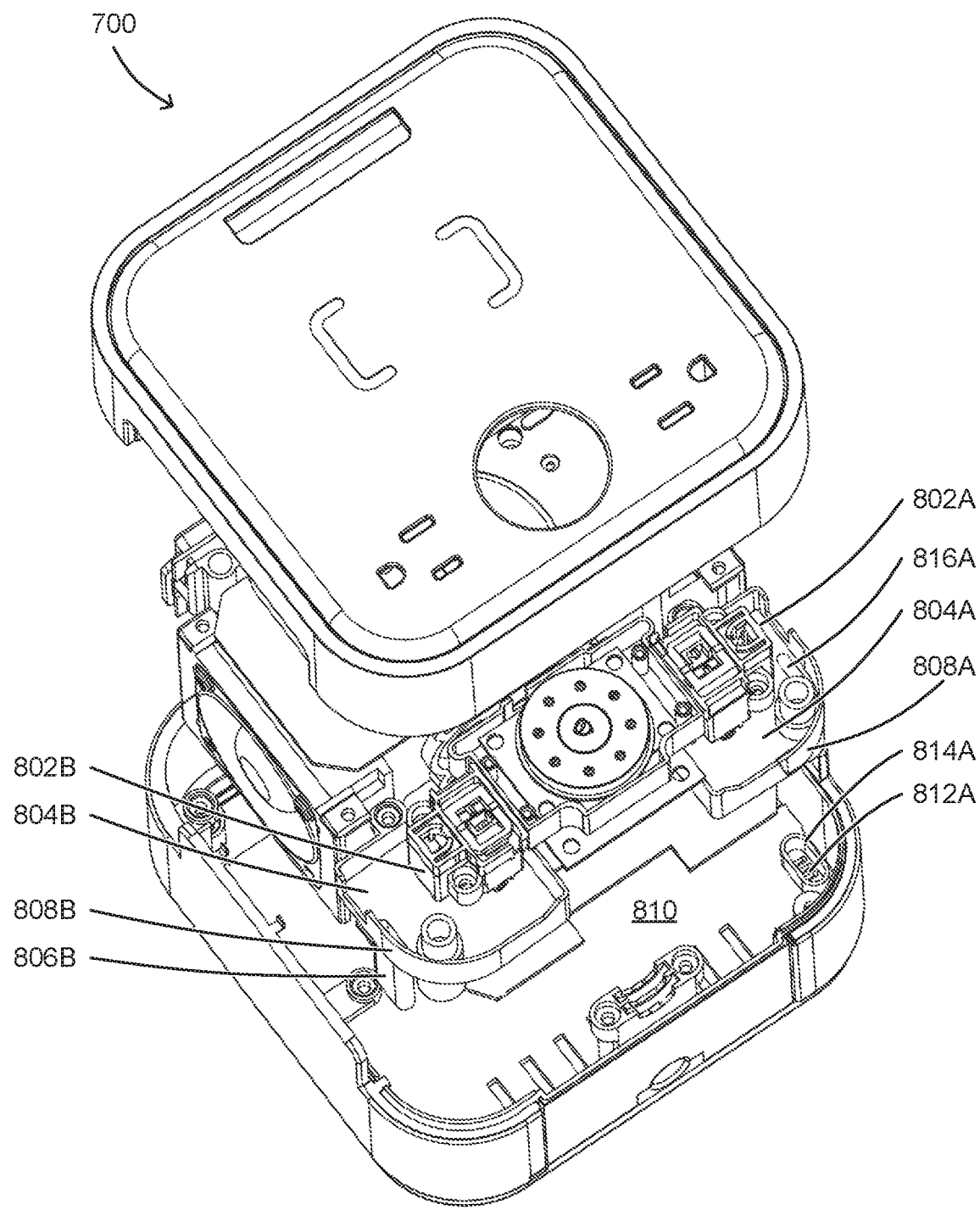
FIG. 9 presents another isometric exploded view of internal components of the charging station of FIG. 7.

FIG. 9 presents another isometric exploded view of internal components of the charging station 700 of FIG. 7. The AC outlets 802A and 802B are positioned above the liquid control chambers 804A and 804B, respectively. The liquid control chamber 804A includes a wall 808A that extends around the periphery of the liquid control chamber 804A and is configured to retain liquid passing through the AC outlet 802A while the liquid drains down through the top end 816A of the drain tube 806A. The liquid control chamber 804B includes a similarly configured wall 808B. Notches in the walls 808A and 808B are filled in the assembled charging station 700 by other components that prevent liquid from passing through the notches, rather than through the top ends of the drain tubes 806A and 806B.

A chassis 810, forming a bottom side of the charging station 700, includes drain aperture 812A surrounded by a wall 814A. A bottom end of the drain tube 806A (not visible in FIG. 9) mates with the wall 814A, such that substantially all liquid exiting the drain tube 806A is retained by the wall 814A while the liquid exits the charging station 700 via the drain aperture 812A. The chassis 810 further includes a drain aperture surrounded by a wall (neither visible in FIG. 9) that mates with a bottom end of the drain tube 806B to receive liquid exiting from the bottom end of the drain tube 806B.

Figure 10:
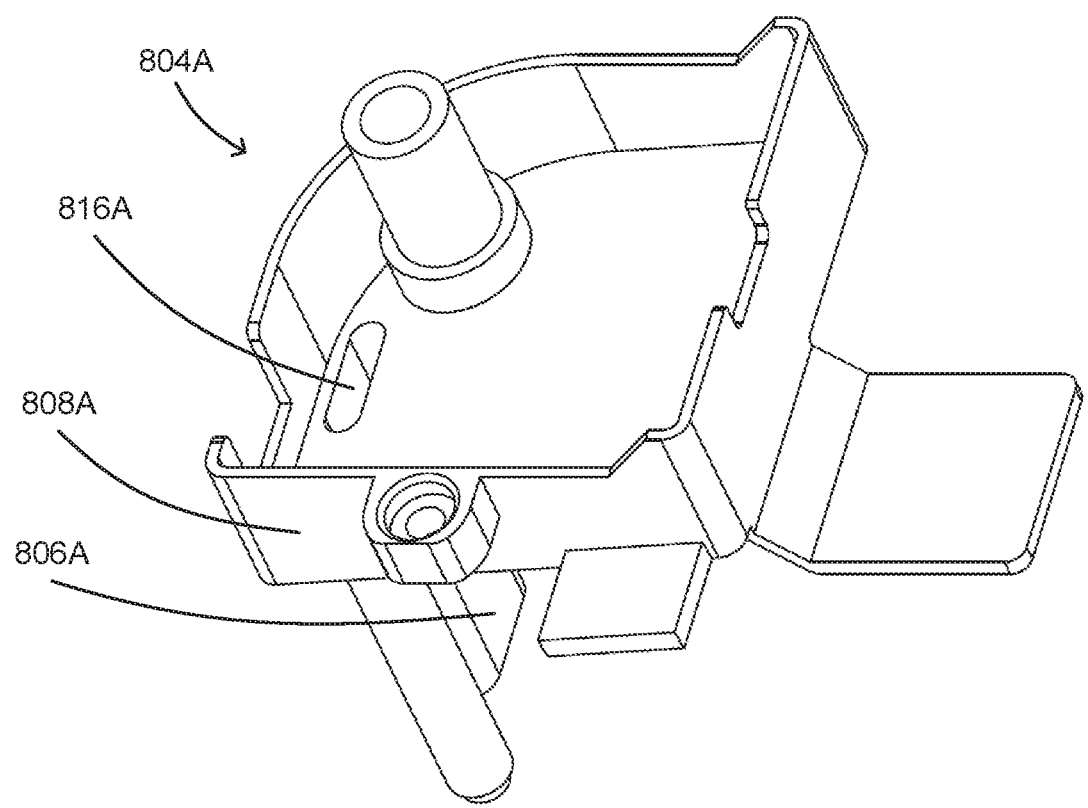
FIG. 10 presents an isometric view of the liquid control chamber of the charging station of FIG. 7.

FIG. 10 presents an isometric view of the liquid control chamber 804A of the charging station 700 of FIG. 7. The wall 808A and the drain tube 806A are visible in FIG. 10, as is the top end 816A of the drain tube 806A.

Thus, the liquid control chamber 804A, the wall 814A, and the drain aperture 812A are configured to allow liquid introduced into the AC outlet 802A to pass through the charging station 700 without contacting electronics or other components within the charging station 700 other than the AC outlet 802A. Similarly, the liquid control chamber 804B and the associated wall and drain aperture not visible in FIG. 9 are configured to allow liquid introduced into the AC outlet 802B to pass through the charging station 700 without contacting electronics or components other than the AC outlet 802B.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A charging station, comprising:
    an alternating current (AC) outlet located in a top side of the charging station, the AC outlet configured to provide AC electrical power to an external device;
    a universal serial bus (USB) outlet located in a second side of the charging station;
    a wireless charging circuit, configured to sense a presence of an electronic device placed in proximity to the top side of the charging station and wirelessly charge the electronic device;
    a liquid control chamber located within the charging station and beneath the AC outlet, the liquid control chamber comprising one or more first walls and a drain tube, the liquid control chamber configured to receive liquid passing through the AC outlet and direct substantially all the liquid passing through the AC outlet to a top end of the drain tube; and
    a drain aperture in a bottom side of the charging station, the drain aperture surrounded by one or more second walls, the one or more second walls configured to retain substantially all liquid exiting a bottom end of the drain tube while the liquid exiting the bottom end of the drain tube exits the charging station via the drain aperture.

2. The charging station of claim 1, wherein the wireless charging circuit is adapted to charge using the Qi wireless charging standard.

3. The charging station of claim 1, wherein the wireless charging circuit is adapted to detect a wireless charging standard used by the electronic device and to wirelessly charge the electronic device using the detected standard.

4. The charging station of claim 3, wherein the charging station further comprises a display, and the charging station is adapted to indicate via the display the wireless charging standard being used to charge the electronic device.

5. The charging station of claim 1, wherein the charging station is adapted to sense a charging power requirement of a device electrically connected to the USB outlet, and to provide a preset amperage to the USB outlet based on the sensed charging power requirement of the device.

6. The charging station of claim 1, wherein the charging station further comprises a wireless receiver, electrically coupled to a speaker, wherein the wireless receiver is adapted to receive a wireless signal from an external audio source and output via the speaker an audio signal corresponding to the received wireless signal.

7. The charging station of claim 6, wherein the wireless receiver is a Bluetooth-compatible receiver.

8. The charging station of claim 6, wherein the charging station further comprises a display, and the charging station is adapted to indicate via the display one or both of whether the wireless receiver is in wireless communication with the external audio source and, if so, a signal strength of the wireless communication signal.

9. The charging station of claim 6, wherein the charging station further comprises:
    a clock controller electrically coupled to a display;
    a plurality of multi-function controls;
    and an audio transducer,
    wherein the clock controller is adapted to provide alarm clock functionality via the display and audio transducer, and to control the alarm clock functionality in response to activation of one or more of the multi-function controls.

10. The charging station of claim 9, wherein the multi-function controls are capacitive touch sensors in the shape of a ring and a button.

11. The charging station of claim 9, wherein the wireless charging circuit is adapted to charge using the Qi wireless charging standard.

12. The charging station of claim 9, wherein the wireless charging circuit is adapted to detect a wireless charging standard used by the electronic device and to wirelessly charge the electronic device using the detected standard.

13. The charging station of claim 12, wherein the charging station further comprises a display, and the charging station is adapted to indicate via the display the wireless charging standard being used to charge the electronic device.

14. The charging station of claim 9, wherein the AC outlet comprises a tamper-resistant outlet.

15. The charging station of claim 9, wherein the charging station is adapted to sense a charging power requirement of a device electrically connected to the USB outlet, and to provide a preset amperage to the USB outlet based on the sensed charging power requirement of the device.

16. The charging station of claim 1, wherein the charging station further comprises:
    a clock controller electrically coupled to a display;
    a plurality of multi-function controls;
    and an audio transducer,
    wherein the clock controller is adapted to provide alarm clock functionality via the display and audio transducer, and to control the alarm clock functionality in response to activation of one or more of the multi-function controls.

17. The charging station of claim 16, wherein the multi-function controls are capacitive touch sensors in the shape of a ring and a button.

18. The charging station of claim 16, wherein the wireless charging circuit is adapted to detect a wireless charging standard used by the electronic device and to wirelessly charge the electronic device using the detected standard.

19. The charging station of claim 18, wherein the charging station further comprises a display, and the charging station is adapted to indicate via the display the wireless charging standard being used to charge the electronic device.

20. The charging station of claim 16, wherein the charging station is adapted to sense a charging power requirement of a device electrically connected to the USB outlet, and to provide a preset amperage to the USB outlet based on the sensed charging power requirement of the device.

* * * * *